Patented Jan. 5, 1926.

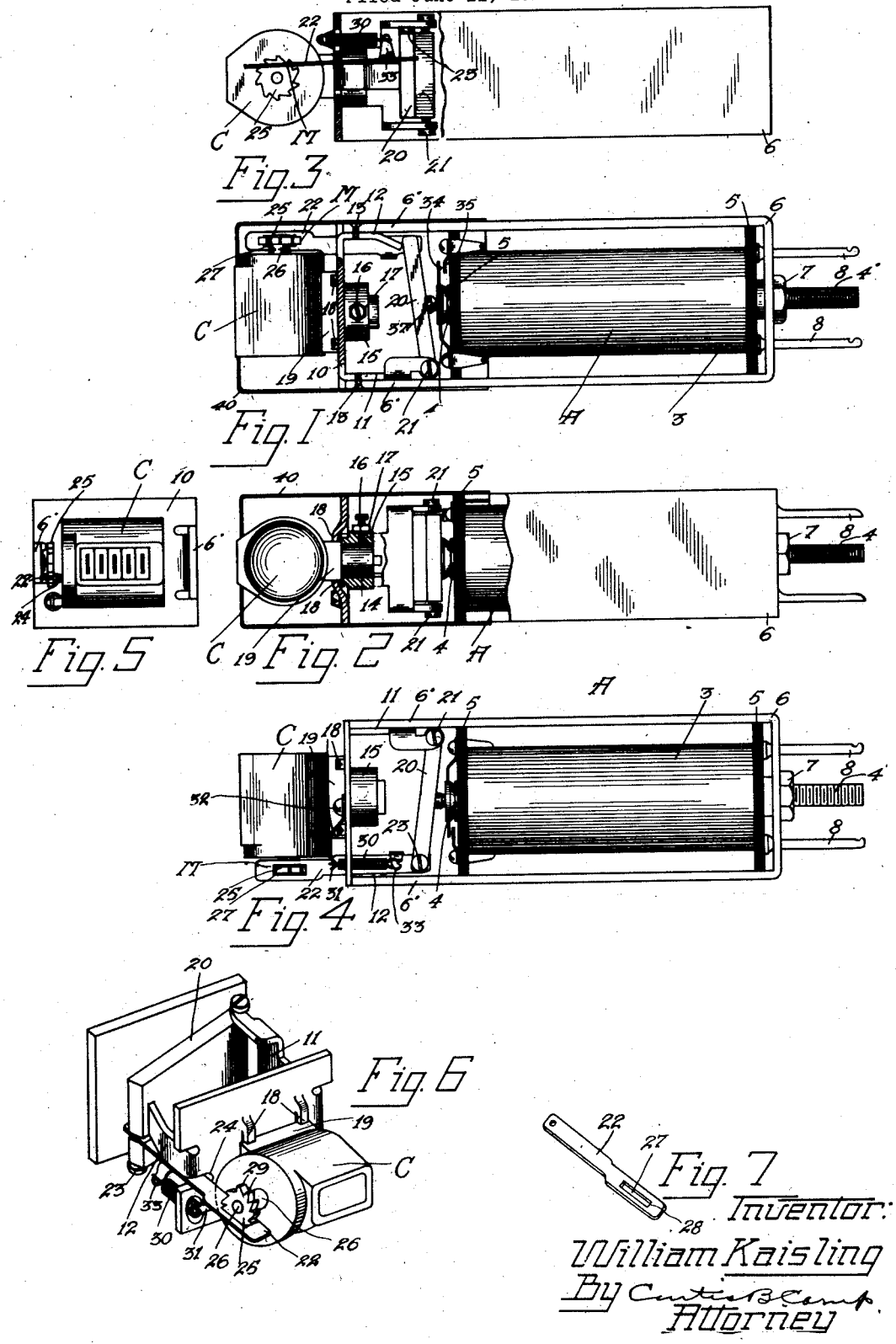

1,568,164

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

SERVICE METER.

Application filed June 11, 1921. Serial No. 476,757.

*To all whom it may concern:*

Be it known that I, WILLIAM KAISLING, a citizen of the United States of America, and a resident of Chicago, county of Cook, and State of Illinois, have invented certain new and useful Improvements in Service Meters, of which the following is a specification.

My invention relates to meters and has to do more particularly with service meters which are used in connection with telephone exchange systems, for recording the number of calls answered by an operator. In the art of telephony this is known as a peg count, and it is an object of my invention to construct a service meter of the above class which is simple in construction, efficient in its operation and economical to manufacture. The meter of my invention when used in connection with a telephone system for registering the number of calls answered by an operator is usually mounted in the face of the switchboard, there being a meter in each operator's position. It is essential that the meter for purposes of this kind be accurate in its registration, and to this end I have devised an improved mechanism in connection with the register or counting train. While I have pointed out one specific use for the service meter of my invention, it is to be understood that it is adapted for various other uses, such, for example, as the keeping of a record of the calls from a subscriber's station.

A feature of my invention is an improved ratchet and pawl mechanism in connection with a register or counting train mechanism, actuating each time the magnet of the service meter is energized to positively step the registering mechanism ahead to register a connection or a call.

The above features, as well as others, will be more fully hereinafter described, and for a more complete understanding of my invention reference may be had to the accompanying drawings, in which like reference characters in the several views denote like parts, and in which—

Fig. 1 is a plan view of the service meter of my invention with the enclosing cap in section;

Fig. 2 is a side elevation of the service meter with certain parts broken away to more clearly illustrate its construction;

Fig. 3 is an elevation of the service meter looking in a direction opposite that of Fig. 2;

Fig. 4 is a bottom view of the device as shown in Fig. 1;

Fig. 5 is an end view of Fig. 2 with the cap removed;

Fig. 6 is a perspective view of the end portion of the service meter;

Fig. 7 is a perspective view of the pawl.

Referring now more in detail to my invention as illustrated in the accompanying drawing, I illustrate therein the embodiment of my invention. The service meter comprises a register or counting train C of the well known Veeder type, which is actuated by means of a suitable ratchet and pawl mechanism M. A suitable electromagnet A is provided having an energizing winding 3 wound upon a core 4 between the respective spool head ends 5. A U-shaped heel iron 6 supports the electromagnet A as a whole between its legs 6' by means of a nut 7 which has screw-threaded engagement with a threaded extension 4' of the core 4. Suitable terminals 8 are provided for the energizing winding of the electromagnet A, the said terminals 8 being secured to one of the spool heads 5. The terminals 8 extend through openings in the heel iron 6 and permit the electromagnet to be connected to the external circuit with which it is associated. A front plate 10 is provided and comprises two angular rearwardly extending members 11 and 12 which extend parallel with the legs 6' of the U-shaped heel iron 6. Screws 13 are provided which pass through suitable openings in the forward ends of the legs 6' of the heel iron 6, the said screws 13 having screw-threaded engagement with suitable tapped orifices in the angular extensions 11 and 12 of the plate 10 to secure the said plate 10 to the heel iron 6, as illustrated in the several views. To mount the counter train C to the plate 10 the casing which encloses the counter train is provided with a cylindrical lug 14 integrally formed with the casing, and a sleeve 15 secured to the plate 10 in any suitable manner, as by means of a staking operation, and is provided with an opening of a size to receive the lug 14. A set screw 16 having screw-threaded engagement with a suitable tapped orifice in the sleeve 15 holds the counter C upon the plate 10, and a lock nut 17 holds the screw 16 in its set position after it has been tightened. To prevent rotation of the counter C in the sleeve 15 after it is in place, the plate 10 is provided with four lugs 18 integrally formed with the plate 10 by means of a shearing operation, and which are so spaced as to permit the extension 19 of the counter C to rest between the said lugs 18. The rearwardly extending member 11 of the plate 10 is provided with a pair of ears angularly displaced in relation with the member 11, and which are spaced to receive the armature 20, which is pivotally supported between the ears by means of the pivot screws 21. A pawl 22 is provided which is pivotally secured to the free end of the armature 20 by means of a pivot screw 23 and extends forward through a slot 24 in the plate 10 and cooperates with a ratchet 25 secured to the shaft 26 of the counter C. The forward end of the pawl 22 is provided with a rectangular shaped orifice 27 in which a portion of the ratchet 25 rests so that the edge 28 of the orifice 27 engages a tooth 29 of the ratchet 25. A coil spring 30 is provided for holding the armature 20 in its normal retracted position, its one end being secured to a clip 31 fastened to the plate 10 by means of a screw 32, and the other end of spring 30 is attached to an angular extension 33 integrally formed with the pawl 22. The tension of the spring 30 is such as to exert an upward pull upon the pawl 22, and this upward pull holds the pawl 22 in engagement with the ratchet 25. The rearwardly extending member 12 of the plate 10 serves as an adjustable stop for the armature 20 when in its retracted position, and permits the proper adjustment of stroke of the armature 20, that is, the rearwardly extending member 12, may be bent inwardly to permit a longer stroke of the armature 20, or bent outwardly to shorten the stroke of said armature 20. A set of contact springs 34 and 35 for the usual purpose are secured to the spool head 5 by means of screws and are moved to their engaging position. A buffer 37 of suitable insulation material is secured to the armature 20, the said buffer 37 engaging the spring 34 to move it into engagement with the spring 35 upon the attraction of the armature 20. The forward end of the service meter is provided with an enclosing cap 40, which encloses the ratchet and pawl mechanism M and counter C, and the face of the cap 40 is provided with an opening of a size to permit the face of the counter C to project through a short distance so the register figures are clearly legible.

Now, when the electromagnet A energizes, its armature 20 is attracted and the pawl 22 moves with it, causing the edge 28 to engage a tooth 29 of the ratchet 25 to advance the ratchet 25 one step, causing shaft 26 to rotate and actuate the registering train to register once. Upon de-energization the armature 20 is retracted by the spring 30 against the stop 12, and the pawl 22 moves forward, allowing the edge 28 of the opening 27 to engage the next tooth 29 of the ratchet 25.

While I have illustrated and described a particular embodiment of my invention, I do not wish to be limited to the exact structure as shown, but aim to cover all such changes and modifications as come within the spirit and scope of the appended claims.

What I claim as new and desire to secure by United States Letters Patent, is:

1. A device of the character described including an electromagnet having a U-shaped heel iron, a front plate secured to and between the free ends of the legs of said U-shaped heel iron and adapted to close the gap between said free ends, an armature pivotally supported on said front plate, a pawl pivotally secured to the armature, a register mechanism secured to the front plate and a shaft therefor having a ratchet secured thereto, a rectangular orifice in the forward end of said pawl cooperating with said ratchet to actuate said register mechanism upon each energization of said electromagnet, and adjustable stop-means integrally formed with said front plate for regulating the stroke of said armature.

2. A device of the character described including an electromagnet having a U-shaped heel iron, an armature, a front plate secured to and between the free ends of the legs of said U-shaped heel iron and of a size to close the gap between said free ends, an angular extension for said front plate provided with ears for pivotally supporting an armature, a pawl pivotally secured to said armature and extending forward through said front plate, a register mechanism secured to said front plate and provided with a shaft having a ratchet secured thereto, an orifice in the forward end of said pawl into which said ratchet extends and cooperates with the said orifice in said pawl to actuate the said register mechanism upon each attraction of said armature, and adjustable stop-means integrally formed with said front plate for engaging said armature to regulate the extent of the pivotal movement of said armature.

3. A device of the character described including an electromagnet having a U-shaped heel iron, an armature, a front plate secured to and between the free ends of the legs of said U-shaped heel iron and of a size to close the gap between said free ends, supporting means for pivotally supporting said armature, an adjustable stop integrally formed with said front plate for said armature, a pawl pivotally secured to said armature and extending forward through said front plate, and an orifice in the forward end of the same; a register mechanism secured to said front plate including a shaft and a ratchet secured thereto, said orifice in said pawl cooperating with said ratchet to actuate said register mechanism, and spring means one end of which is secured to said pawl and the other end of which is secured to said front plate for holding said armature in its normal position and for holding said pawl in operative relation with said ratchet.

4. In a device of the character described, including an electromagnet, a U-shaped member for said electromagnet, a mounting plate provided with an opening, an armature pivotally supported on one side and between ears integrally formed with said mounting plate, register mechanism having an extension for engaging said opening in said plate whereby said register mechanism engages other side of mounting plate, means for securing said register mechanism to said mounting plate, a member secured to said armature for actuating said register mechanism, and means for securing said armature, mounting plate and register mechanism as a unit to and between the free ends of the legs of said U-shaped member and in operative relation with the core of said electromagnet, said mounting plate being of a size to close the gap between said ends.

5. A device of the character described including an electromagnet having a U-shaped heel iron, a front plate secured to and between the free ends of the legs of said U-shaped heel iron and of a size to close the gap between said free ends, said plate being provided with an opening and a plurality of integrally formed outwardly extending ears in close proximity to said opening, register mechanism, means for securing said register mechanism to said plate, said register mechanism positioned on said plate by said opening and said ears, a pair of flange members integrally formed on said plate, an armature pivotally supported at its one end between said flange member and in operative position relative to said electromagnet, an actuating member pivotally supported in the other end of said armature and having operative engagement with said register mechanism for actuating the same when said armature is attracted by said electromagnet, spring means for restoring said armature to normal from its attracted position, and means on said plate for guiding said actuating member from said armature to said register mechanism.

6. A device of the character described including an electromagnet having a U-shaped heel iron, a front plate secured to and between the free ends of the legs of said U-shaped heel iron and of a size to close the gap between said free ends, said plate being provided with an opening and integrally formed outwardly and downwardly extending ears, register mechanism provided with a casing, means for securing said register mechanism to said plate, said casing engaging said plate and said ears to position said register mechanism on said plate, a pair of flange members integrally formed with said plate, an armature pivotally supported at its one end between said flange members and in operative relation with said electromagnet, an actuating member pivotally supported in the other end of said armature and extending into operative engagement with said register mechanism for actuating said register mechanism, said plate being adapted to guide said actuating member relative to said register mechanism, an adjustable member integrally formed with said plate for regulating the pivotal movement of said armature, and means for restoring said armature and actuating member to normal position upon each deenergization of said electromagnet.

Signed by me at Chicago, in the county of Cook and State of Illinois, this 9th day of June, 1921.

WILLIAM KAISLING.